US012760680B2

(12) United States Patent
Viele et al.

(10) Patent No.: US 12,760,680 B2
(45) Date of Patent: Oct. 13, 2026

(54) APPARATUS AND METHODS FOR PLASMA ASSISTED COMBUSTION

(71) Applicant: VIELETECH INC., Woodland Park, CO (US)

(72) Inventors: Matthew Viele, Florissant, CO (US); Taylor F. Linker, Woodland Park, CO (US)

(73) Assignee: VIELETECH INC., Woodland Park, CO (US)

( * ) Notice: Subject to any disclaimer, the term of this patent is extended or adjusted under 35 U.S.C. 154(b) by 0 days.

(21) Appl. No.: 18/927,153

(22) Filed: Oct. 25, 2024

(65) Prior Publication Data

US 2025/0137400 A1 May 1, 2025

Related U.S. Application Data

(60) Provisional application No. 63/546,131, filed on Oct. 27, 2023.

(51) Int. Cl.
*F02B 19/10* (2006.01)
*F02B 19/12* (2006.01)
*F02B 51/04* (2006.01)

(52) U.S. Cl.
CPC .............. *F02B 19/10* (2013.01); *F02B 19/12* (2013.01); *F02B 51/04* (2013.01)

(58) Field of Classification Search
CPC .......... F02B 19/10; F02B 19/12; F02B 51/04; F02P 9/007
See application file for complete search history.

(56) References Cited

U.S. PATENT DOCUMENTS 10,208,651 B2 * 2/2019 Tozzi ...................... F02B 19/12
11,346,317 B1 * 5/2022 Wagh ...................... F02P 9/002
2016/0160741 A1 * 6/2016 Gu ...................... F02B 19/1004
123/275
2021/0131337 A1 * 5/2021 Bromberg ............ H05H 1/2418

* cited by examiner

*Primary Examiner* — Grant Moubry
(74) *Attorney, Agent, or Firm* — Viksnins Harris Padys Malen LLP

(57) ABSTRACT

Apparatus and methods for plasma assisted combustion are disclosed. An apparatus includes a pre-combustion chamber including a pre-combustion chamber neck having a pre-combustion chamber orifice and the pre-combustion chamber neck including a non-conductive substrate and an electrode embedded in the non-conductive substrate. A method includes introducing a fuel into a pre-combustion chamber of an engine having a main combustion chamber, generating a plasma in the pre-combustion chamber, over-fueling the pre-combustion chamber to form a mixture in the pre-combustion chamber, ceasing the generation of the plasma; igniting the mixture in the pre-combustion chamber through radical induced ignition to produce a combustion gas in the pre-combustion chamber, and channeling the combustion gas via the pre-combustion chamber orifice into the main combustion chamber.

2 Claims, 14 Drawing Sheets

APPARATUS AND METHODS FOR PLASMA ASSISTED COMBUSTION

CROSS-REFERENCE TO RELATED APPLICATIONS

This application claims the benefit of U.S. Provisional Application No. 63/546,131 that was filed on Oct. 27, 2023. The entire contents of the application referenced above are hereby incorporated by reference herein.

FIELD

The subject matter of the present disclosure generally relates to engines and, more particularly, to pre-combustion chambers and plasma assisted combustion.

BACKGROUND

The operation of combustion engines can result in the release of unwanted gases that can contribute to air pollution. To reduce the release of unwanted gases in the combustion process, engines have been run on lean fuel mixtures. Unfortunately, engines running on lean fuel mixtures can misfire and run inefficiently. Further, misfiring engines can lead to the release of unwanted gases from the engines. For these and other reasons there is a need for the subject matter of the present disclosure.

SUMMARY

Consistent with the present disclosure, an apparatus comprising a pre-combustion chamber including a pre-combustion chamber neck having a pre-combustion chamber orifice and the pre-combustion chamber neck including a non-conductive substrate and an electrode embedded in the non-conductive substrate is disclosed. In some embodiments, the pre-combustion chamber has an interior having a pre-combustion chamber interior surface and the electrode having an electrode surface forming a portion of the pre-combustion chamber interior surface. In some embodiments, the electrode comprises a ring electrode. In some embodiments, the apparatus further includes a transformer mounted on the pre-combustion chamber. In some embodiments, the apparatus further includes a first circuit mounted on the pre-combustion chamber, the first circuit electrically coupled to the electrode. In some embodiments, the apparatus further includes a second circuit electrically coupled to the first circuit, the second circuit not mounted on the pre-combustion chamber. In some embodiments, the apparatus further includes a spark plug mechanically coupled to the pre-combustion chamber. In some embodiments, the apparatus further includes a plasma plug mechanically coupled to the pre-combustion chamber. In some embodiments, the method further includes an engine fluidically coupled to the pre-combustion chamber.

Consistent with the present disclosure, a method comprises introducing a fuel into a pre-combustion chamber of an engine having a main combustion chamber, generating a plasma in the pre-combustion chamber, over-fueling the pre-combustion chamber to form a mixture in the pre-combustion chamber, ceasing the generation of the plasma, igniting the mixture in the pre-combustion chamber through radical induced ignition to produce a combustion gas in the pre-combustion chamber, and channeling the combustion gas via the pre-combustion chamber orifice into the main combustion chamber.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, during engine compression, introducing a lean air/fuel mixture from the main combustion chamber into the pre-combustion chamber to form a substantially stoichiometric gas mixture in the pre-combustion chamber, generating a plasma in the pre-combustion orifice, igniting a spark plug in the pre-combustion chamber to ignite the substantially stoichiometric gas mixture to form a combustion gas in the pre-combustion chamber, channeling the combustion gas via the pre-combustion chamber orifice into the main combustion chamber, and ceasing the generation of the plasma.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, during engine compression generating a first plasma in the pre-combustion chamber orifice and introducing a lean air/fuel mixture from the main combustion chamber into the pre-combustion chamber to form a highly reactive gas mixture in the pre-combustion chamber, ceasing generation of the first plasma in the pre-combustion chamber orifice, igniting a spark plug in the pre-combustion chamber to ignite the highly reactive gas mixture to form a combustion gas in the pre-combustion chamber, generating a second plasma in the pre-combustion chamber orifice, channeling the combustion gas via the pre-combustion chamber orifice into the main combustion chamber, and ceasing generation of the second plasma in the orifice.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, generating a first plasma in the pre-combustion chamber orifice, over-fueling the pre-combustion chamber to form a mixture in the pre-combustion chamber, ceasing generation of the first plasma, during engine compression generating a second plasma in the pre-combustion chamber orifice and introducing a lean air/fuel mixture from the main combustion chamber into the pre-combustion chamber to form a highly reactive gas mixture in the pre-combustion chamber, ceasing generation of the second plasma in the pre-combustion chamber orifice, igniting a spark plug in the pre-combustion chamber to ignite the highly reactive and lean gas mixture to form a combustion gas in the pre-combustion chamber, generating a third plasma in the pre-combustion orifice, channeling the combustion gas via the pre-combustion chamber orifice into the main combustion chamber, and ceasing generation of the third plasma in the orifice.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, generating a plasma in the pre-combustion chamber orifice, during engine compression, introducing a lean air/fuel mixture from the main combustion chamber into the pre-combustion chamber to form a highly reactive and lean gas mixture in the precombustion chamber, ceasing generation of the plasma, igniting the highly reactive and lean gas mixture in the pre-combustion chamber through radical induced ignition to produce a combustion gas in the pre-combustion chamber, and channeling the combustion gas via the pre-combustion chamber orifice into the main combustion chamber.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, during engine compression, generating a first plasma in the pre-combustion chamber orifice and introducing a lean air/fuel mixture from the main combustion chamber into the pre-combustion chamber to form a highly reactive gas mixture in the pre-combustion chamber, ceasing generation of the first plasma, igniting the mixture in the pre-combustion chamber through radical induced ignition to produce a combustion gas in the pre-combustion chamber, generating a second plasma in the orifice, channeling the combustion gas via the pre-combustion chamber orifice into the main combustion chamber, and ceasing generation of the second plasma.

Consistent with the present disclosure, a method comprises introducing a fuel into a pre-combustion chamber of an engine having a main combustion chamber, the pre-combustion chamber having a pre-combustion chamber orifice fluidically coupling the pre-combustion chamber to the main combustion chamber, generating a first plasma in the pre-combustion chamber orifice, over-fueling the pre-combustion chamber to form a mixture in the pre-combustion chamber; ceasing generation of the first plasma, during engine compression generating a second plasma in the pre-combustion chamber orifice and introducing a lean air/fuel mixture from the main combustion chamber into the pre-combustion chamber to form a highly reactive and lean gas mixture in the pre-combustion chamber, ceasing generation of the second plasma in the pre-combustion chamber orifice, igniting the highly reactive and lean gas mixture in the pre-combustion chamber through radical induced ignition to produce a combustion gas in the pre-combustion chamber, generating a third plasma in the pre-combustion orifice, channeling the combustion gas via the pre-combustion chamber orifice into the main combustion chamber, and ceasing generation of the third plasma in the pre-combustion chamber orifice.

Consistent with the present disclosure, a method comprises generating a plasma in a pre-combustion chamber orifice by providing a first voltage to an electrode included in a neck of the precombustion chamber, measuring a first ion current in the pre-combustion chamber orifice to determine a plasma flow rate by providing a second voltage to the electrode, and measuring a second ion current in the pre-combustion chamber orifice to determine a flame propagation time for a flame generated in the pre-combustion chamber by providing a third voltage to the electrode. In some embodiments, generating the plasma in the pre-combustion chamber orifice by providing the first voltage to the electrode included in the neck of the precombustion chamber comprises providing a voltage of between 10000 volts and 20000 volts to an electrode located in a neck of the precombustion chamber. In some embodiments, measuring the first ion current in the pre-combustion chamber orifice to determine the plasma flow rate comprises providing a voltage of between about 100 volts and about 1000 volts to an electrode located in a neck of the precombustion chamber. In some embodiments, measuring the second ion current in the pre-combustion chamber orifice to determine the flame propagation time for the flame generated in the pre-combustion chamber by providing the third voltage of between about 100 volts and about 1000 volts to the electrode.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION

Reference will now be made in detail to the exemplary embodiments of the present disclosure described below and illustrated in the accompanying drawings. Wherever possible, the same reference numbers will be used throughout to refer to same or like parts.

While the present invention is described herein with reference to illustrative embodiments for particular applications, it should be understood that the invention is not limited thereto. Those having ordinary skill in the art and access to the teachings provided herein will recognize additional modifications, applications, embodiments, and substitution of equivalents, that all fall within the scope of the disclosure. Accordingly, the disclosure is not to be considered as limited by the foregoing or following descriptions.

Figure 1:
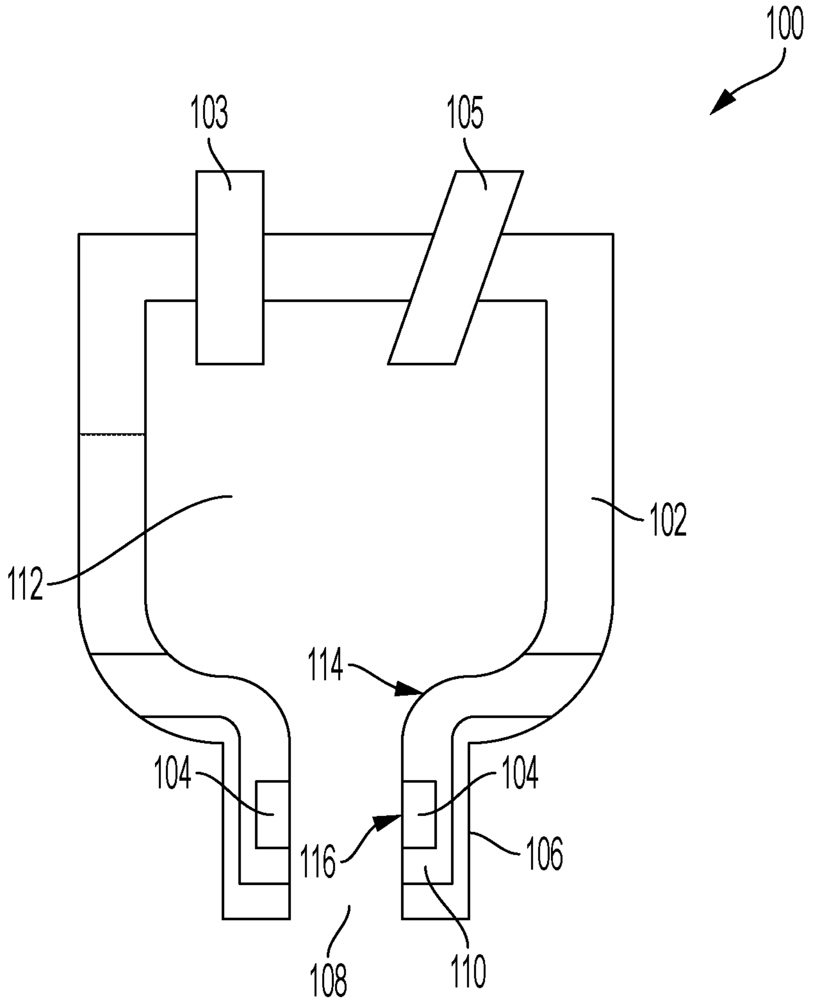
FIG. 1 shows an illustration of a cross-sectional view of an apparatus including a pre-combustion chamber and an electrode in accordance with some embodiments of the present disclosure.

FIG. 1 shows an illustration of a cross-sectional view of an apparatus 100 including a pre-combustion chamber 102 and an electrode 104 in accordance with some embodiments of the present disclosure. The pre-combustion chamber 102 includes a pre-combustion chamber neck 106 having a pre-combustion chamber orifice 108. The pre-combustion chamber neck 106 includes a non-conductive substrate 110. The non-conductive substrate 110 is not limited to being formed from a particular material. Ceramics, such as zirconia ceramics, alumina ceramics, or porcelain are suitable for use in the manufacture of the non-conductive substrate 110. The electrode 104 is embedded in the non-conductive substrate 110. The pre-combustion chamber 102 has an interior 112 having a pre-combustion chamber interior surface 114. The electrode 104 has an electrode surface 116 forming a portion of the pre-combustion chamber interior surface 114. The electrode 104 provides a conductive contact to the pre-combustion chamber orifice 108. In some embodiments, the pre-combustion chamber includes an energy source 103. The pre-combustion chamber 102 also includes a fueling port 105 to provide fuel to the pre-combustion chamber 102.

The energy source 103 is not limited to a particular type of energy source. In some embodiments, the energy source 103 is a spark plug. In operation, a spark plug includes two electrodes separated by an air gap across which the current from an ignition system discharges to form the spark to initiate combustion in the pre-combustion chamber 102. In some embodiments, the energy source 103 is a plasma plug. In operation, a plasma plug uses short duration pulses, pulses having a duration on the order of nanoseconds, to ignite a fuel/air mixture in the pre-combustion chamber 102.

Figure 2:
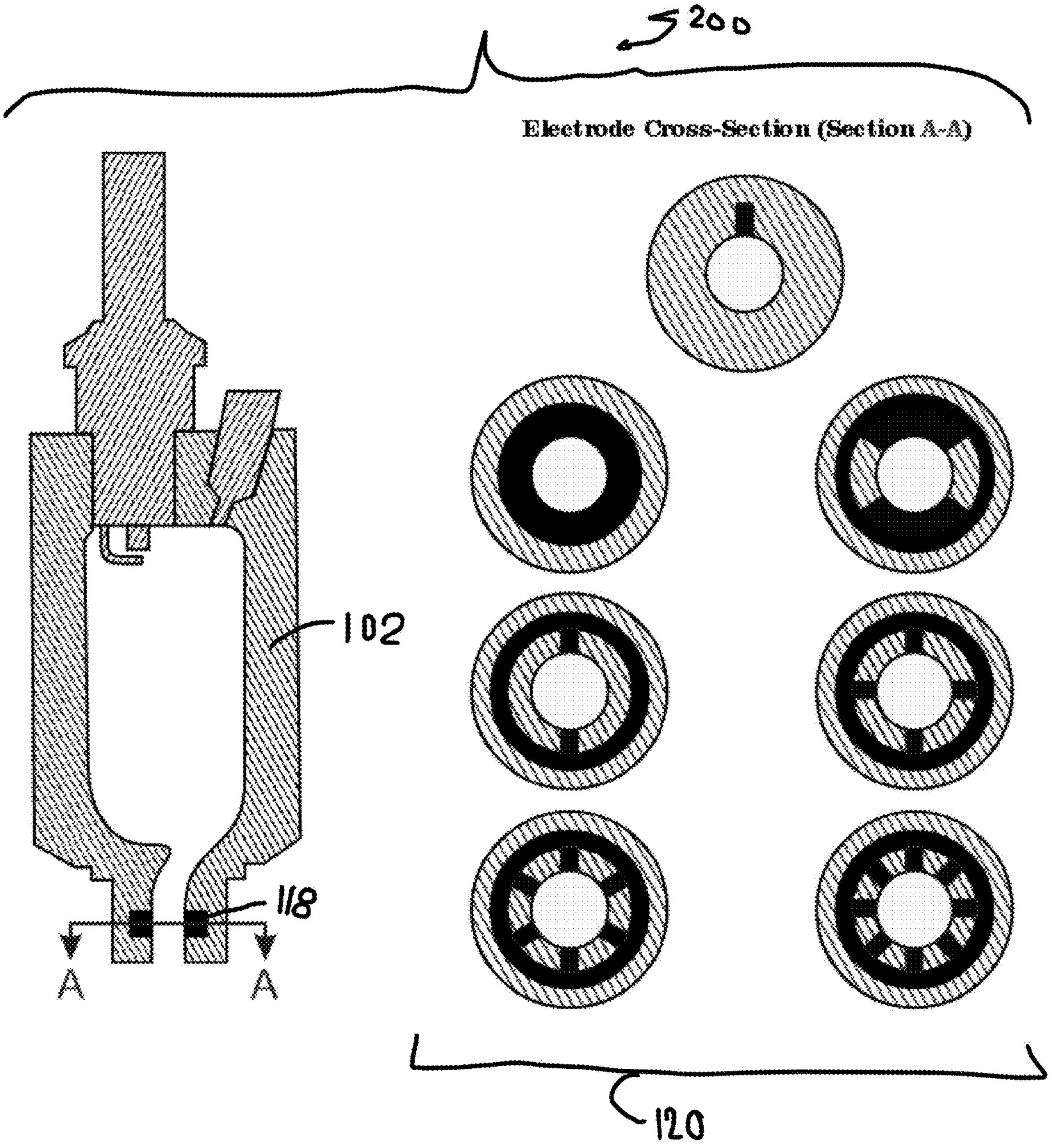
FIG. 2 shows an illustration of a cross sectional view of a pre-combustion chamber including a ring electrode and cross-sections of electrodes suitable for use with the pre-combustion chamber in accordance with some embodiments of the present disclosure.

Electrode 104 is not limited to a particular configuration or material. Rings, single point contact electrodes, and multiple point contact electrodes are examples of electrodes suitable for use as the electrode 104. FIG. 2 shows an illustration 200 of a cross sectional view of pre-combustion chamber 102 including a ring electrode 118 and cross-sections of electrodes 104 suitable for use with the pre-combustion chamber 102 in accordance with some embodiments of the present disclosure. Materials suitable for use in the fabrication of the electrode 104 include conductors, such as metals. Copper, copper alloys, aluminum, and aluminum alloys are example metals suitable for use in the fabrication of electrode 104. Top view of electro cross-sections 120 are also shown with electrode configuration variations including single and multiple electrode configurations.

Figure 6:
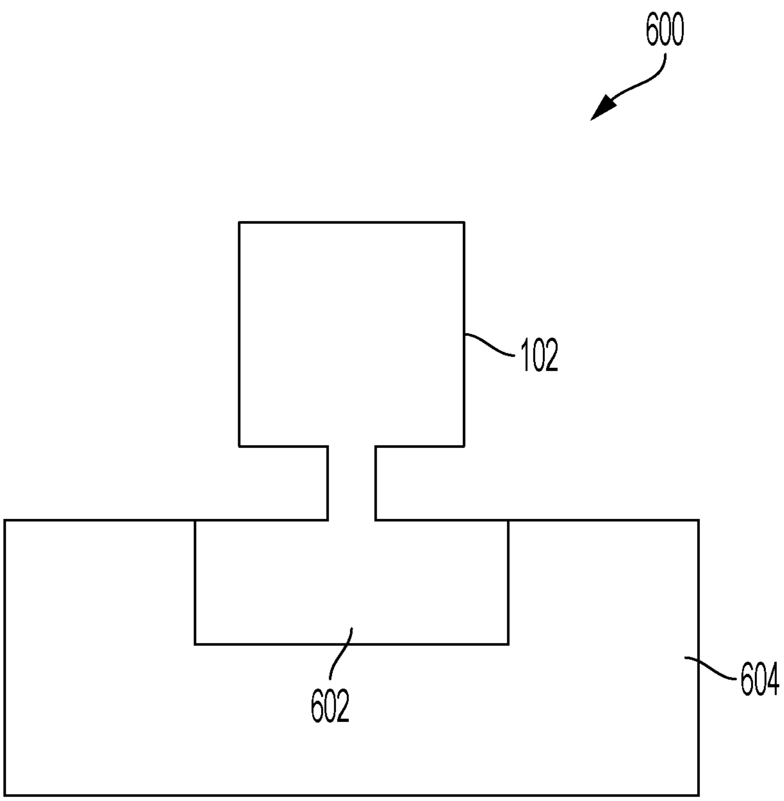
FIG. 6 shows a block diagram of the pre-combustion chamber fluidically coupled to an engine in accordance with some embodiments of the present disclosure.

Referring again to FIG. 1, in operation, pre-combustion chamber 102 is fluidically coupled to a main combustion chamber 602 (shown in FIG. 6) in an engine 604 (shown in FIG. 6). In operation, gases and plasmas are freely exchanged between the pre-combustion chamber 102 and the main combustion chamber 602 in engine 604.

Figure 3:
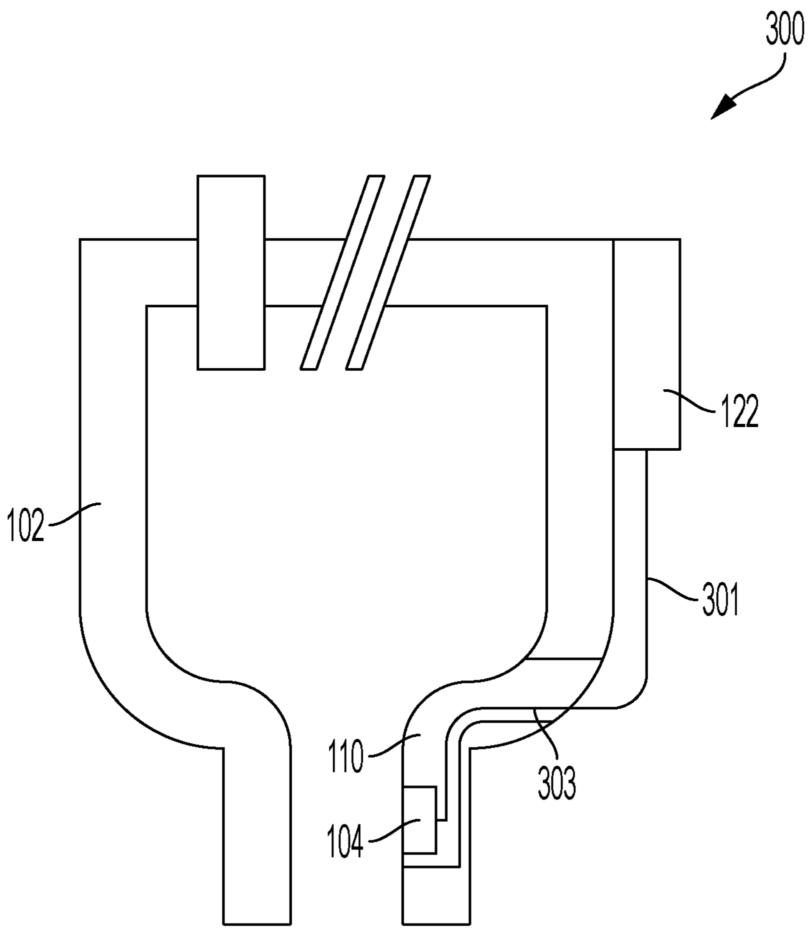
FIG. 3 shows an illustration of the pre-combustion chamber and a transformer mounted on the pre-combustion chamber in accordance with some embodiments of the present disclosure.

FIG. 3 shows an illustration 300 of the pre-combustion chamber 102 and a transformer 122 mounted on the pre-combustion chamber 102 in accordance with some embodiments of the present disclosure. In some embodiments, the transformer 122 is coupled to an electrode 104 through an external conductor 301 and conductor 303 embedded in the non-conductive substrate 110. In some embodiments, the transformer 122 is a step-up transformer providing an output voltage. In operation, to generate a plasma in the pre-combustion chamber neck 104 signals of between ten kilovolts and twenty kilovolts are provided by the transformer 122 to the electrode 104. In some embodiments, the signals are pulses having a pulse width of between about ten nanoseconds and one-hundred nanoseconds. The time between pulses is between about one-hundred nanoseconds and one microsecond.

Figure 4:
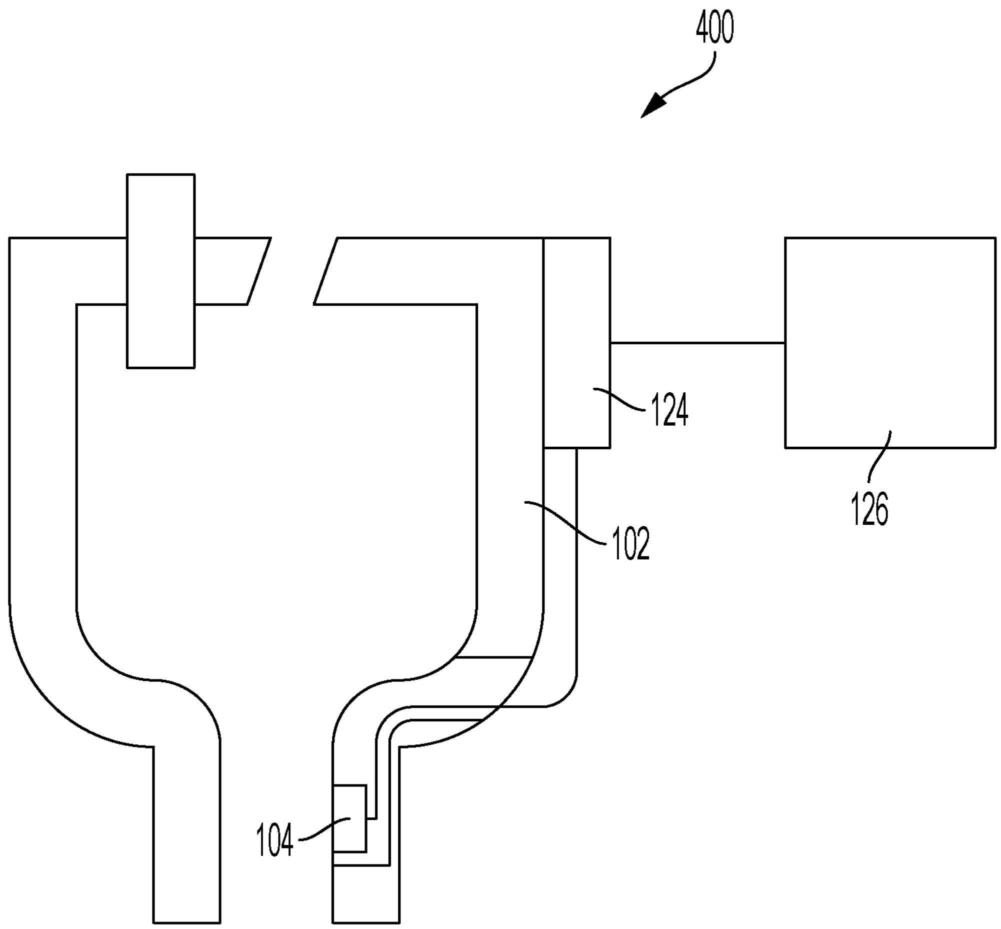
FIG. 4 shows an illustration of the pre-combustion chamber and a first circuit mounted on the pre-combustion chamber and a second circuit in accordance with some embodiments of the present disclosure.

FIG. 4 shows an illustration 400 of a cross sectional view of the pre-combustion chamber 102 and a first circuit 124 mounted on the pre-combustion chamber 102 and a second circuit 126 in accordance with some embodiments of the present disclosure. The second circuit 126 is not mounted on the pre-combustion chamber 102. The first circuit 124 is electrically coupled to electrode 104. And the second circuit 124 is electrically coupled to the first circuit 122. In some embodiments, the first circuit 124 is the transformer 122 (shown in FIG. 3) and the second circuit 126 provides an input signal to the first circuit 124.

Figure 5:
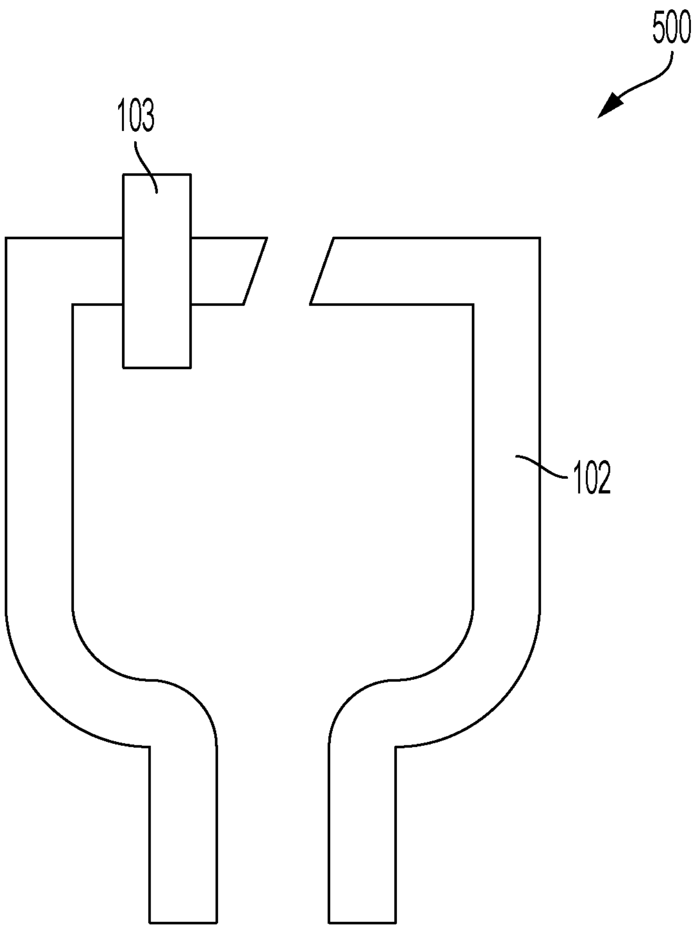
FIG. 5 shows an illustration of the pre-combustion chamber including an energy source in accordance with some embodiments of the present disclosure.

FIG. 5 shows an illustration 500 of the pre-combustion chamber 102 including the energy source 103 in accordance with some embodiments of the present disclosure. In some embodiments, the energy source 103 is a spark plug. In some embodiments, the energy source 103 is a plasma plug. The energy source 103 is mechanically coupled to the pre-combustion chamber 102. In some embodiments, the energy source 103 is mechanically coupled to the pre-combustion chamber 102 via a threaded screw with external threads on the energy source 103 and internal threads on the pre-combustion chamber 102.

FIG. 6 shows a block diagram 600 of the pre-combustion chamber 102 fluidically coupled to a main combustion chamber 602 included in an engine 604 in accordance with some embodiments of the present disclosure. In operation, the pre-combustion chamber 102 exchanges gases and plasmas with the main combustion chamber 602 of the engine 604. In particular, the methods shown in FIGS. 7-13 and described below teach embodiments of methods for operating the pre-combustion chamber 102 in combination with the main combustion chamber 602 to power the engine 604.

Figure 7:
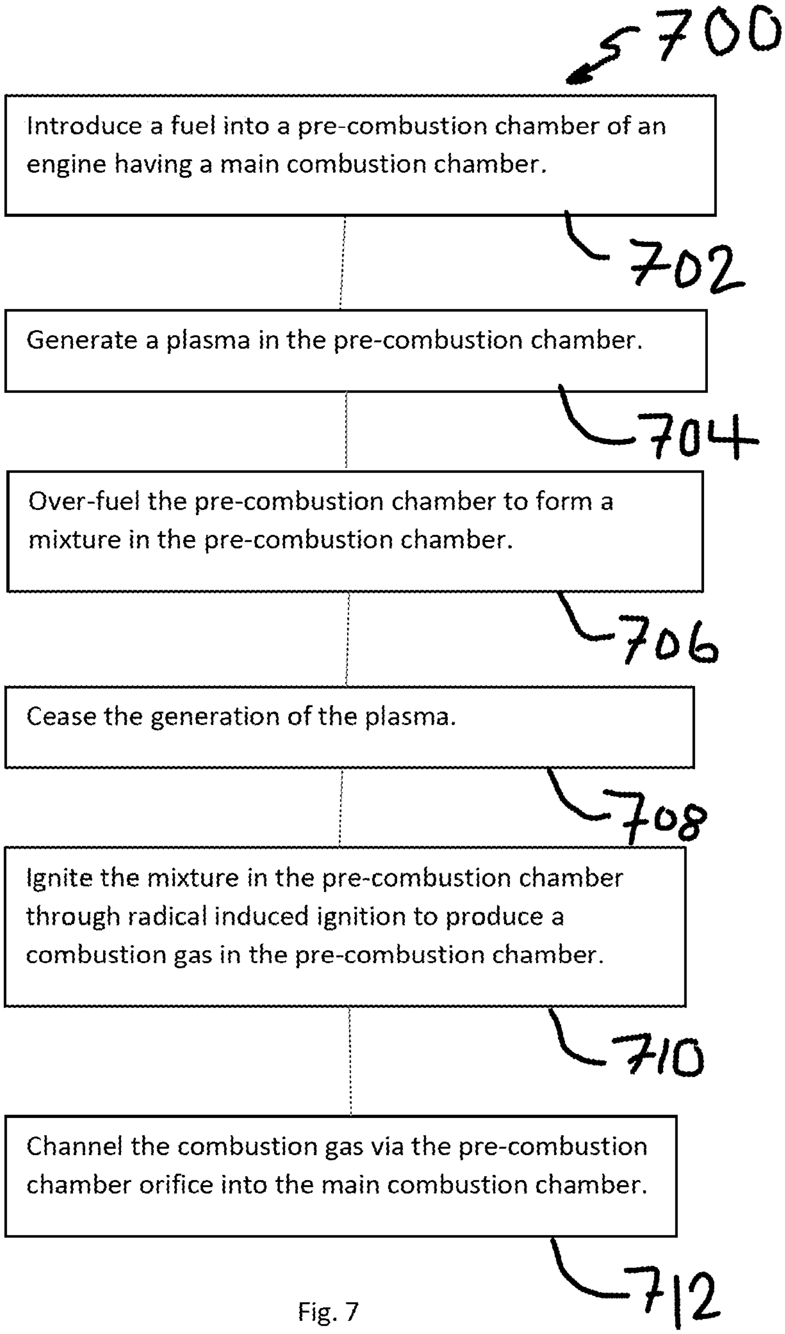
FIG. 7 shows a method for ignition and combustion in an engine including a pre-combustion chamber, a main combustion chamber, over-fueling, plasma generation, and radical-induced ignition in accordance with some embodiments of the present disclosure.

FIG. 7 shows a method 700 for ignition and combustion in an engine including a pre-combustion chamber, a main combustion chamber, over-fueling, plasma generation, and radical-induced ignition in accordance with some embodiments of the present disclosure. The method 700 includes introducing a fuel into a pre-combustion chamber of an engine having a main combustion chamber (block 702); generating a plasma in the pre-combustion chamber (block 704); over-fueling the pre-combustion chamber to form a mixture in the pre-combustion chamber (block 706); ceasing the generation of the plasma (block 708); igniting the mixture in the pre-combustion chamber through radical induced ignition to produce a combustion gas in the pre-combustion chamber (block 710); and channeling the combustion gas via the pre-combustion chamber orifice into the main combustion chamber (block 712).

Referring again to FIG. 1 and FIG. 6, the apparatus shown in FIG. 1 and the apparatus shown in FIG. 6 can be used to implement the method 700 in accordance with some embodiments of the present disclosure. For example, fuel can be introduced into the pre-combustion chamber 102 through the fueling port 105. Plasma may be generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. Over-fueling is putting enough fuel into the pre-combustion chamber 102 that it blows out into the main chamber 602. Ceasing generation of the plasma is accomplished by shutting off the high energy signal previously provided to the electrode 104. Radical induced ignition is ignition that results from a high concentration of radicals in the fuel mixture and occurs spontaneously in the pre-combustion chamber 102 without energy being provided by a spark plug, a plasma plug, or other ignition source. And the combustion gas can be channeled via the pre-combustion chamber orifice 108 into the main combustion chamber 602 of the engine 604.

Figure 8:
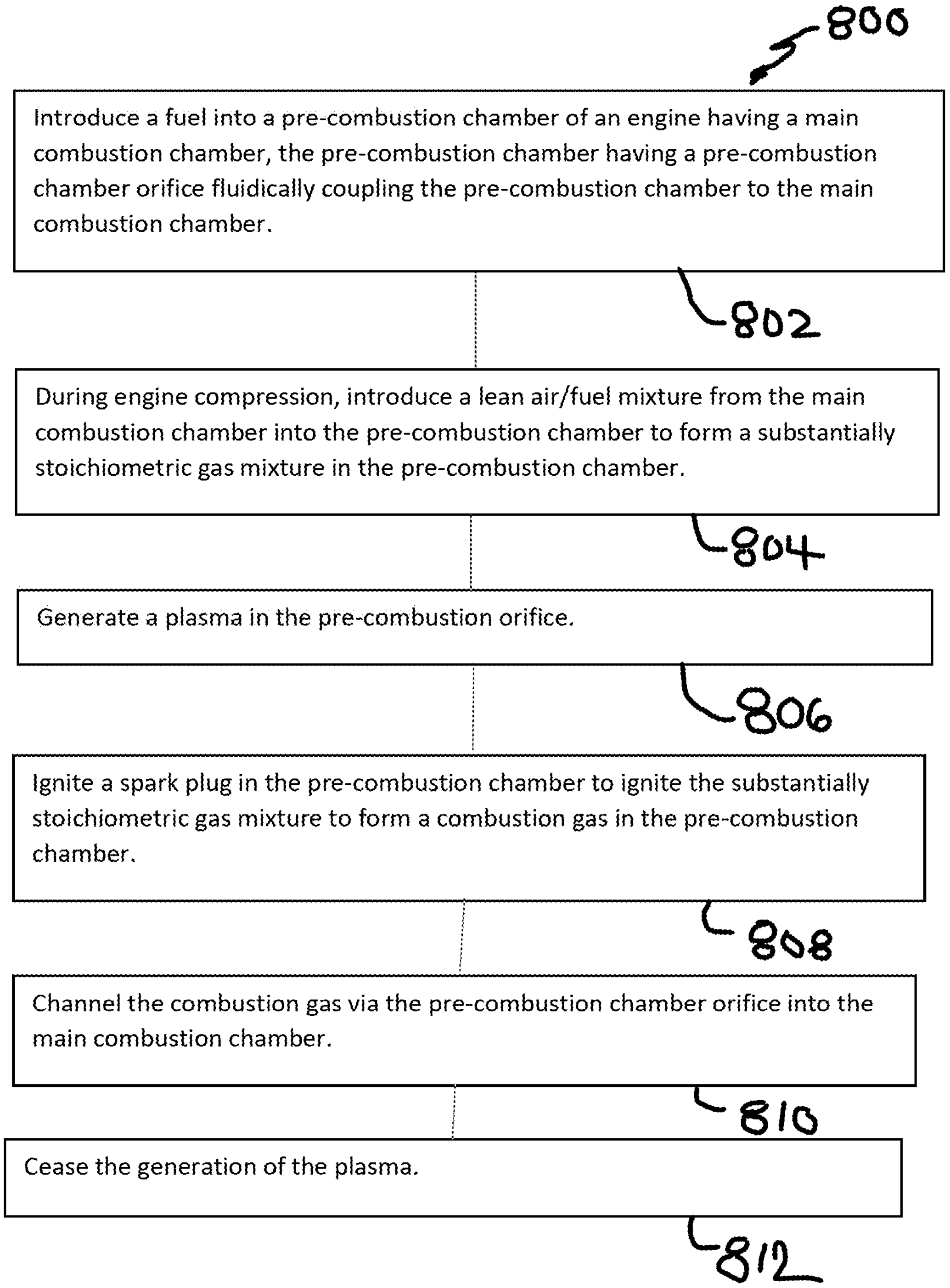
FIG. 8 shows a method for ignition and combustion in an engine including a pre-combustion chamber, a main combustion chamber, outflow plasma generation, and spark plug induced ignition in accordance with some embodiments of the present disclosure.

FIG. 8 shows a method 800 for ignition and combustion in an engine including a pre-combustion chamber, a main combustion chamber, outflow plasma generation, and spark plug induced ignition in accordance with some embodiments of the present disclosure. The method 800 includes introducing a fuel into a pre-combustion chamber of an engine having a main combustion chamber, the pre-combustion chamber having a pre-combustion chamber orifice fluidically coupling the pre-combustion chamber to the main combustion chamber (block 802); during engine compression, introducing a lean air/fuel mixture from the main combustion chamber into the pre-combustion chamber to form a substantially stoichiometric gas mixture in the pre-combustion chamber (block 804); generating a plasma in the pre-combustion orifice (block 806); igniting a spark plug in the pre-combustion chamber to ignite the substantially stoichiometric gas mixture to form a combustion gas in the pre-combustion chamber (block 808); channeling the combustion gas via the pre-combustion chamber orifice into the main combustion chamber (block 810); and ceasing the generation of the plasma (block 812).

Referring to FIG. 1 and FIG. 6, the apparatus shown in FIG. 1 and the apparatus shown in FIG. 6 can be used to implement method 800 in accordance with some embodiments of the present disclosure. For example, fuel is introduced into the pre-combustion chamber 102 through the fueling port 105. A lean air/fuel mixture is introduced from the main combustion chamber 602 into the pre-combustion chamber 102 to form a substantially stoichiometric gas mixture in the pre-combustion chamber 102 during compression. Substantially stoichiometric is the ideal ratio of air to fuel (A/F ratio) for a given fuel. Lambda is the actual A/F ratio/stoichiometric A/F ratio. As used herein, substantially stoichiometric is lambda=to about 0.7 to lambda=about 1.3. Plasma is generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. A spark plug is ignited by providing a high energy signal to the spark plug which ignites the substantially stoichiometric gas mixture to form a combustion gas in the pre-combustion chamber 102. Example high energy signals for igniting the spark plug include signals between about 30 kilovolts and about 50 kilovolts. This voltage drops after an arc is formed in the spark gap until the energy in the energy storage device that is supplying energy to the spark plug is depleted. And the combustion gas can be channeled via the pre-combustion chamber orifice 108 into the main combustion chamber 602 of the engine 604. Ceasing generation of the plasma is accomplished by shutting off the high energy signal previously provided to the electrode 104.

Figure 9:
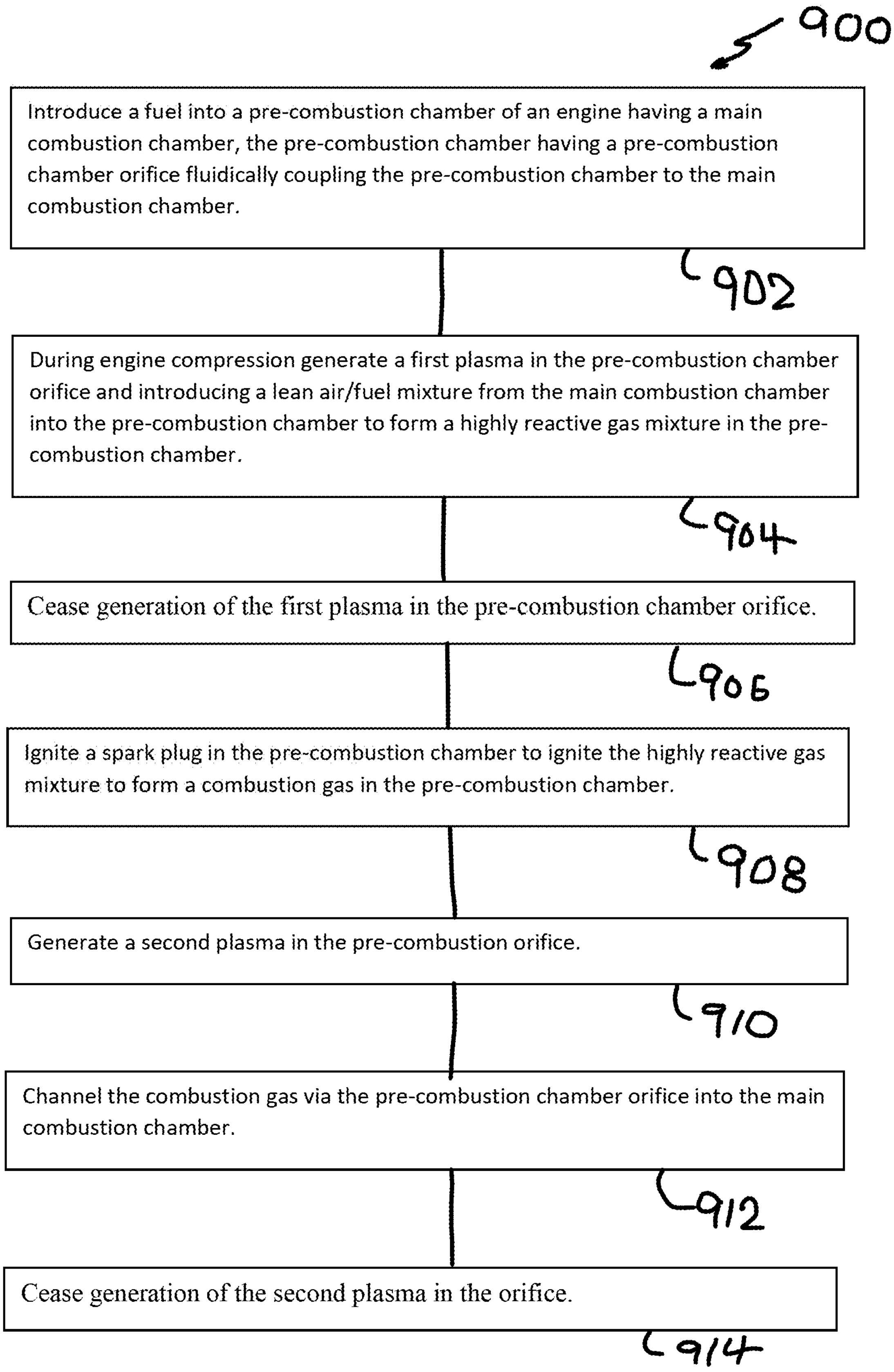
FIG. 9 shows a method for ignition and combustion in an engine including a pre-combustion chamber, a main combustion chamber, inflow plasma generation, outflow plasma generation, and spark plug induced ignition in accordance with some embodiments of the present disclosure.

FIG. 9 shows a method 900 for ignition and combustion in an engine including a pre-combustion chamber, a main combustion chamber, inflow plasma generation, outflow plasma generation, and spark plug induced ignition in accordance with some embodiments of the present disclosure. The method 900 includes introducing a fuel into a pre-combustion chamber of an engine having a main combustion chamber, the pre-combustion chamber having a pre-combustion chamber orifice fluidically coupling the pre-combustion chamber to the main combustion chamber (902); during engine compression generating a first plasma in the pre-combustion chamber orifice and introducing a lean air/fuel mixture from the main combustion chamber into the pre-combustion chamber to form a highly reactive gas mixture in the pre-combustion chamber (904); ceasing generation of the first plasma in the pre-combustion chamber orifice (block 906); igniting a spark plug in the pre-combustion chamber to ignite the highly reactive gas mixture to form a combustion gas in the pre-combustion chamber (block 908); generating a second plasma in the pre-combustion orifice (block 910); channeling the combustion gas via the pre-combustion chamber orifice into the main combustion chamber (block 912); and ceasing generation of the second plasma in the orifice (block 914).

Referring to FIG. 1 and FIG. 6, the apparatus shown in FIG. 1 and the apparatus shown in FIG. 6 can be used to implement method 900 in accordance with some embodiments of the present disclosure. For example, fuel is introduced into the pre-combustion chamber 102 through the fueling port 105. During engine compression, a first plasma is generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. A lean air/fuel mixture is introduced from the main combustion chamber 602 into the pre-combustion chamber 102 to form a substantially stoichiometric gas mixture in the pre-combustion chamber 102 during compression. Substantially stoichiometric is the ideal ratio of air to fuel (A/F ratio) for a given fuel. Lambda is the actual A/F ratio/stoichiometric A/F ratio. As used herein, substantially stoichiometric is lambda=to about 0.7 to lambda=about 1.3. Ceasing generation of the first plasma is accomplished by shutting off the high energy signal previously provided to the electrode 104 located in the pre-combustion chamber neck 106. A spark plug is ignited by providing a high energy signal to the spark plug which ignites the substantially stoichiometric gas mixture to form a combustion gas in the pre-combustion chamber 102. Example high energy signals for igniting the spark plug include signals between about 30 kilovolts and about 50 kilovolts. This voltage drops after an arc is formed in the spark gap until the energy in the energy storage device that is supplying energy to the spark plug is depleted. A second plasma is generated in the pre-combustion chamber 102 by providing a high energy signal to the electrode 104 included in the pre-combustion chamber neck 106. And the combustion gas can be channeled via the pre-combustion chamber orifice 108 into the main combustion chamber 602 of the engine 604. Ceasing generation of the second plasma is accomplished by shutting off the high energy signal previously provided to the electrode 104.

Figure 10:
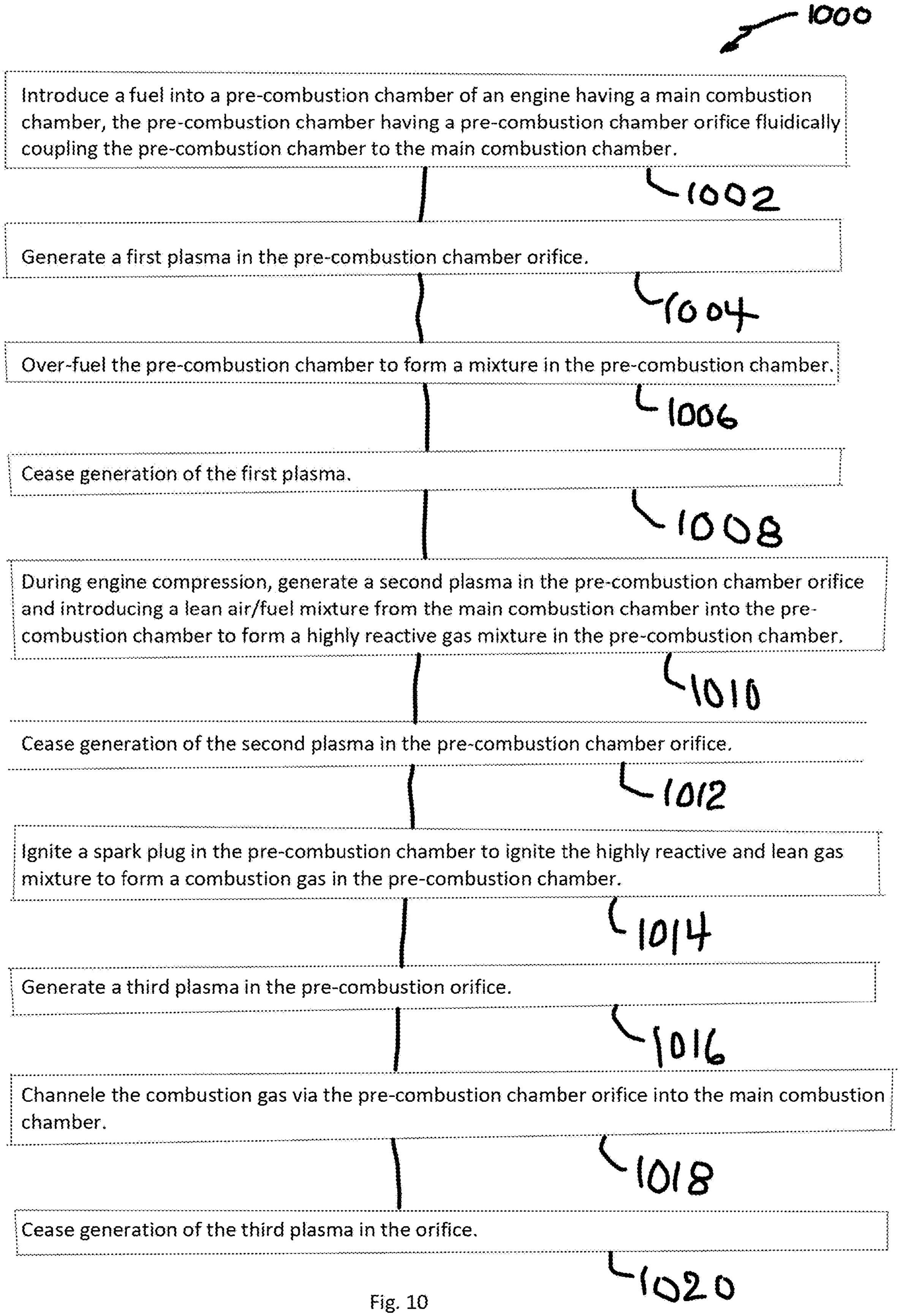
FIG. 10 shows a method for ignition and combustion in an engine including a pre-combustion chamber, a main combustion chamber, over-fueling, inflow plasma generation, outflow plasma generation and spark plug induced ignition in accordance with some embodiments of the present disclosure.

FIG. 10 shows a method 1000 for ignition and combustion in an engine including a pre-combustion chamber, a main combustion chamber, over-fueling, inflow plasma generation, outflow plasma generation and spark plug induced ignition in accordance with some embodiments of the present disclosure. The method 1000 includes introducing a fuel into a pre-combustion chamber of an engine having a main combustion chamber, the pre-combustion chamber having a pre-combustion chamber orifice fluidically coupling the pre-combustion chamber to the main combustion chamber (block 1002); generating a first plasma in the pre-combustion chamber orifice (block 1004); over-fueling the pre-combustion chamber to form a mixture in the pre-combustion chamber (block 1006); ceasing generation of the first plasma (block 1008); during engine compression generating a second plasma in the pre-combustion chamber orifice and introducing a lean air/fuel mixture from the main combustion chamber into the pre-combustion chamber to form a highly reactive gas mixture in the pre-combustion chamber (block 1010); ceasing generation of the second plasma in the pre-combustion chamber orifice (block 1012); igniting a spark plug in the pre-combustion chamber to ignite the highly reactive and lean gas mixture to form a combustion gas in the pre-combustion chamber (1014); generating a third plasma in the pre-combustion orifice (block 1016); channeling the combustion gas via the pre-combustion chamber orifice into the main combustion chamber (block 1018); and ceasing generation of the third plasma in the orifice (block 1020).

Referring to FIG. 1 and FIG. 6, the apparatus shown in FIG. 1 and the apparatus shown in FIG. 6 can be used to implement method 1000 in accordance with some embodiments of the present disclosure. For example, a fuel is introduced into the pre-combustion chamber 102 through the fueling port 105. A first plasma is generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. Over-fueling is putting enough fuel into the pre-combustion chamber 102 that it blows out into the main chamber 602. Ceasing generation of the first plasma is accomplished by shutting off the high energy signal previously provided to the electrode 104 located in the pre-combustion chamber neck 106. During engine compression, a second plasma is generated in the pre-combustion chamber 102 by providing a high energy signal to the electrode 104 included in the pre-combustion chamber neck 106. A lean air/fuel mixture is introduced from the main combustion chamber 602 into the pre-combustion chamber 102 to form a substantially stoichiometric gas mixture in the pre-combustion chamber 102 during compression. Substantially stoichiometric is the ideal ratio of air to fuel (A/F ratio) for a given fuel. Lambda is the actual A/F ratio/stoichiometric A/F ratio. As used herein, substantially stoichiometric is lambda=to about 0.7 to lambda=about 1.3. Ceasing generation of the second plasma is accomplished by shutting off the high energy signal previously provided to the electrode 104 located in the pre-combustion chamber neck 106. A spark plug is ignited by providing a high energy signal to the spark plug which ignites the highly reactive and lean gas mixture to form a combustion gas in the pre-combustion chamber 102. Example high energy signals for igniting the spark plug include signals between about 30 kilovolts and about 50 kilovolts. This voltage drops after an arc is formed in the spark gap until the energy in the energy storage device that is supplying energy to the spark plug is depleted. A third plasma is generated in the pre-combustion chamber 102 by providing a high energy signal to the electrode 104 included in the pre-combustion chamber neck 106. And the combustion gas can be channeled via the pre-combustion chamber orifice 108 into the main combustion chamber 602 of the engine 604. Ceasing generation of the third plasma is accomplished by shutting off the high energy signal previously provided to the electrode 104.

Figure 11:
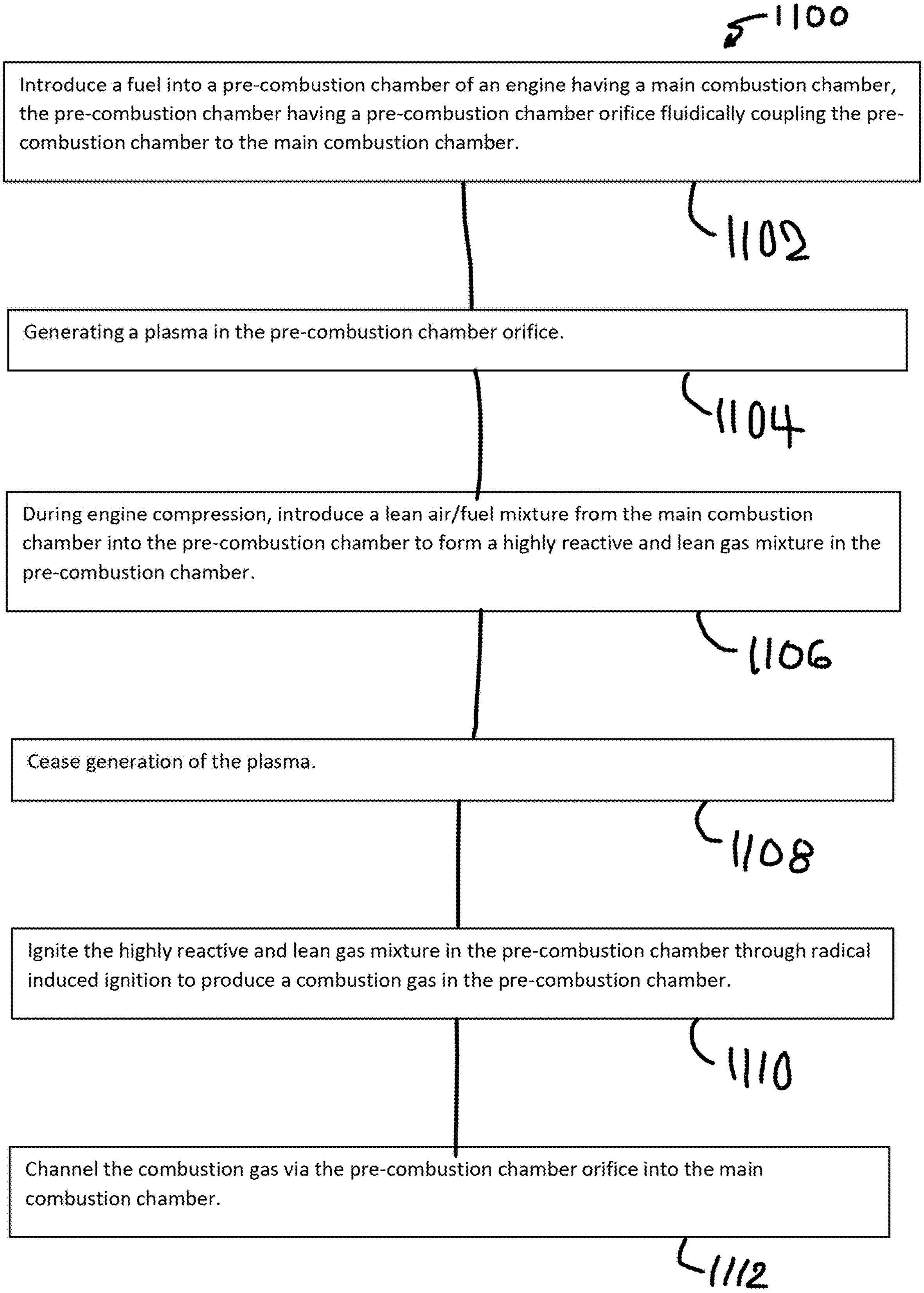
FIG. 11 shows a method for ignition and combustion in an engine including a pre-combustion chamber, a main combustion chamber, inflow plasma generation, and radical-induced ignition in accordance with some embodiments of the present disclosure.

FIG. 11 shows a method 1100 for ignition and combustion in an engine including a pre-combustion chamber, a main combustion chamber, inflow plasma generation, and radical-induced ignition in accordance with some embodiments of the present disclosure. The method 1100 includes introducing a fuel into a pre-combustion chamber of an engine having a main combustion chamber, the pre-combustion chamber having a pre-combustion chamber orifice fluidically coupling the pre-combustion chamber to the main combustion chamber (1102); generating a plasma in the pre-combustion chamber orifice (1104); during engine compression, introducing a lean air/fuel mixture from the main combustion chamber into the pre-combustion chamber to form a highly reactive and lean gas mixture in the pre-combustion chamber (1106); ceasing generation of the plasma (1108); igniting the highly reactive and lean gas mixture in the pre-combustion chamber through radical induced ignition to produce a combustion gas in the pre-combustion chamber (1110); and channeling the combustion gas via the pre-combustion chamber orifice into the main combustion chamber (block 1112).

Referring to FIG. 1 and FIG. 6, the apparatus shown in FIG. 1 and the apparatus shown in FIG. 6 can be used to implement method 1100 in accordance with some embodiments of the present disclosure. For example, a fuel is introduced into the pre-combustion chamber 102 through the fueling port 105. A plasma is generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. During engine compression, a lean air/fuel mixture is introduced from the main combustion chamber 602 into the pre-combustion chamber 102 to form a highly reactive and lean gas mixture in the pre-combustion chamber 102. Ceasing generation of the plasma is accomplished by shutting off the high energy signal previously provided to the electrode 104 located in the pre-combustion chamber neck 106. Radical induced ignition is ignition that results from a high concentration of radicals in the fuel mixture and occurs spontaneously in the pre-combustion chamber 102 without energy being provided by a spark plug, a plasma plug, or other ignition source. And the combustion gas can be channeled via the pre-combustion chamber orifice 108 into the main combustion chamber 602 of the engine 604.

Figure 12:
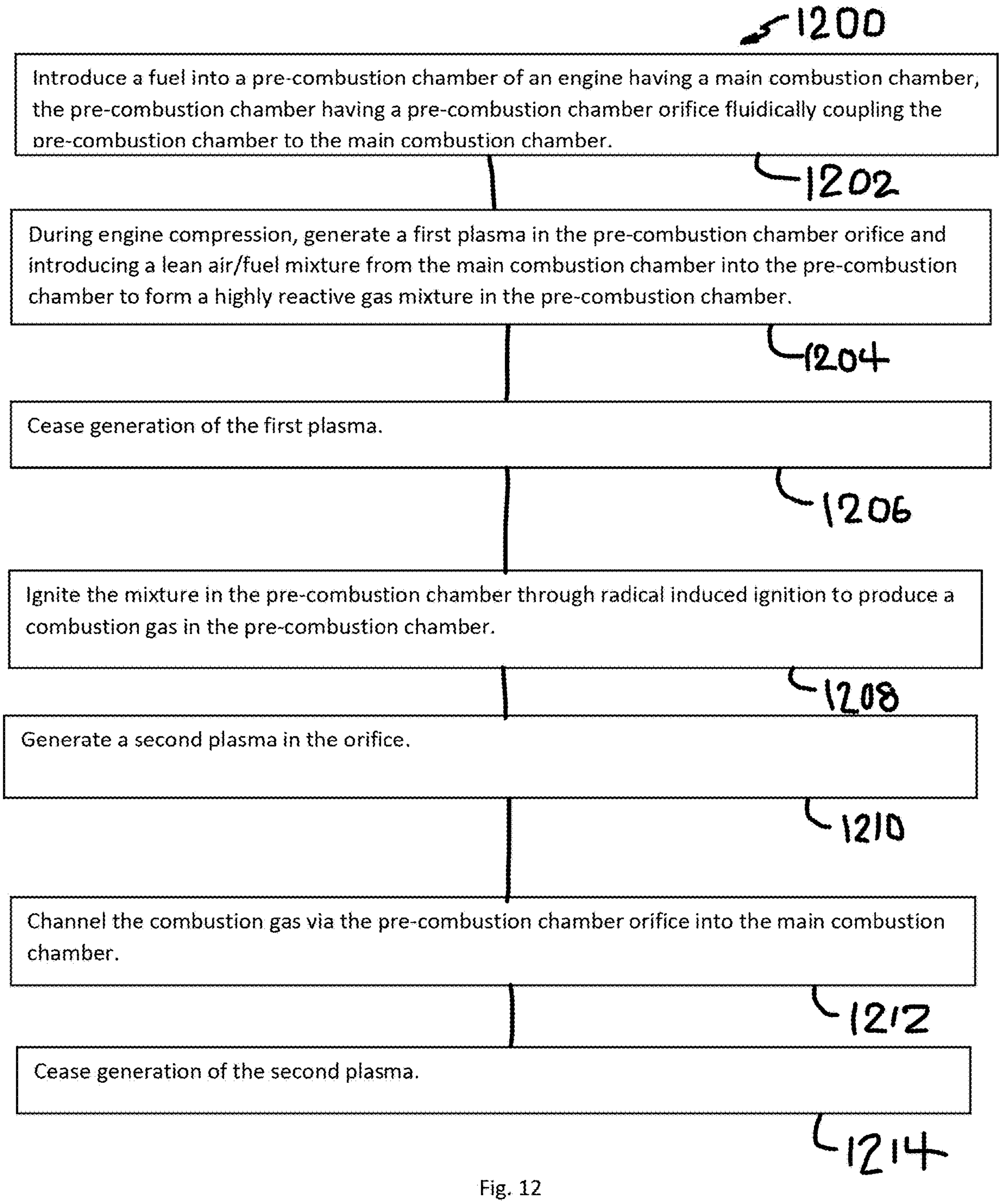
FIG. 12 shows a method for ignition and combustion in an engine including a pre-combustion chamber, a main combustion chamber, inflow plasma generation, outflow plasma generation, and radical-induced ignition in accordance with some embodiments of the present disclosure.

FIG. 12 shows a method 1200 for ignition and combustion in an engine including a pre-combustion chamber, a main combustion chamber, inflow plasma generation, outflow plasma generation, and radical-induced ignition in accordance with some embodiments of the present disclosure. The method 1200 includes introducing a fuel into a pre-combustion chamber of an engine having a main combustion chamber, the pre-combustion chamber having a pre-combustion chamber orifice fluidically coupling the pre-combustion chamber to the main combustion chamber (block 1202); during engine compression, generating a first plasma in the pre-combustion chamber orifice and introducing a lean air/fuel mixture from the main combustion chamber into the pre-combustion chamber to form a highly reactive gas mixture in the pre-combustion chamber (block 1204); ceasing generation of the first plasma (block 1206); igniting the mixture in the pre-combustion chamber through radical induced ignition to produce a combustion gas in the pre-combustion chamber (block 1208); generating a second plasma in the orifice (block 1210); channeling the combustion gas via the pre-combustion chamber orifice into the main combustion chamber (block 1212); and ceasing generation of the second plasma (block 1214).

Referring to FIG. 1 and FIG. 6, the apparatus shown in FIG. 1 and the apparatus shown in FIG. 6 can be used to implement method 1200 in accordance with some embodiments of the present disclosure. For example, a fuel is introduced into the pre-combustion chamber 102 through the fueling port 105. During engine compression, a first plasma is generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. A lean air/fuel mixture is introduced from the main combustion chamber 602 into the pre-combustion chamber 102 to form a substantially stoichiometric gas mixture in the pre-combustion chamber 102 during compression.

Substantially stoichiometric is the ideal ratio of air to fuel (A/F ratio) for a given fuel. Lambda is the actual A/F ratio/stoichiometric A/F ratio. As used herein, substantially stoichiometric is lambda=to about 0.7 to lambda=about 1.3. Ceasing generation of the first plasma is accomplished by shutting off the high energy signal previously provided to the electrode 104 located in the pre-combustion chamber neck 106. Radical induced ignition is ignition that results from a high concentration of radicals in the fuel mixture and occurs spontaneously in the pre-combustion chamber 102 without energy being provided by a spark plug, a plasma plug, or other ignition source. A second plasma is generated in the pre-combustion chamber 102 by providing a high energy signal to the electrode 104 included in the pre-combustion chamber neck 106. And the combustion gas can be channeled via the pre-combustion chamber orifice 108 into the main combustion chamber 602 of the engine 604. Ceasing generation of the second plasma is accomplished by shutting off the high energy signal previously provided to the electrode 104 located in the pre-combustion chamber neck 106.

Figure 13:
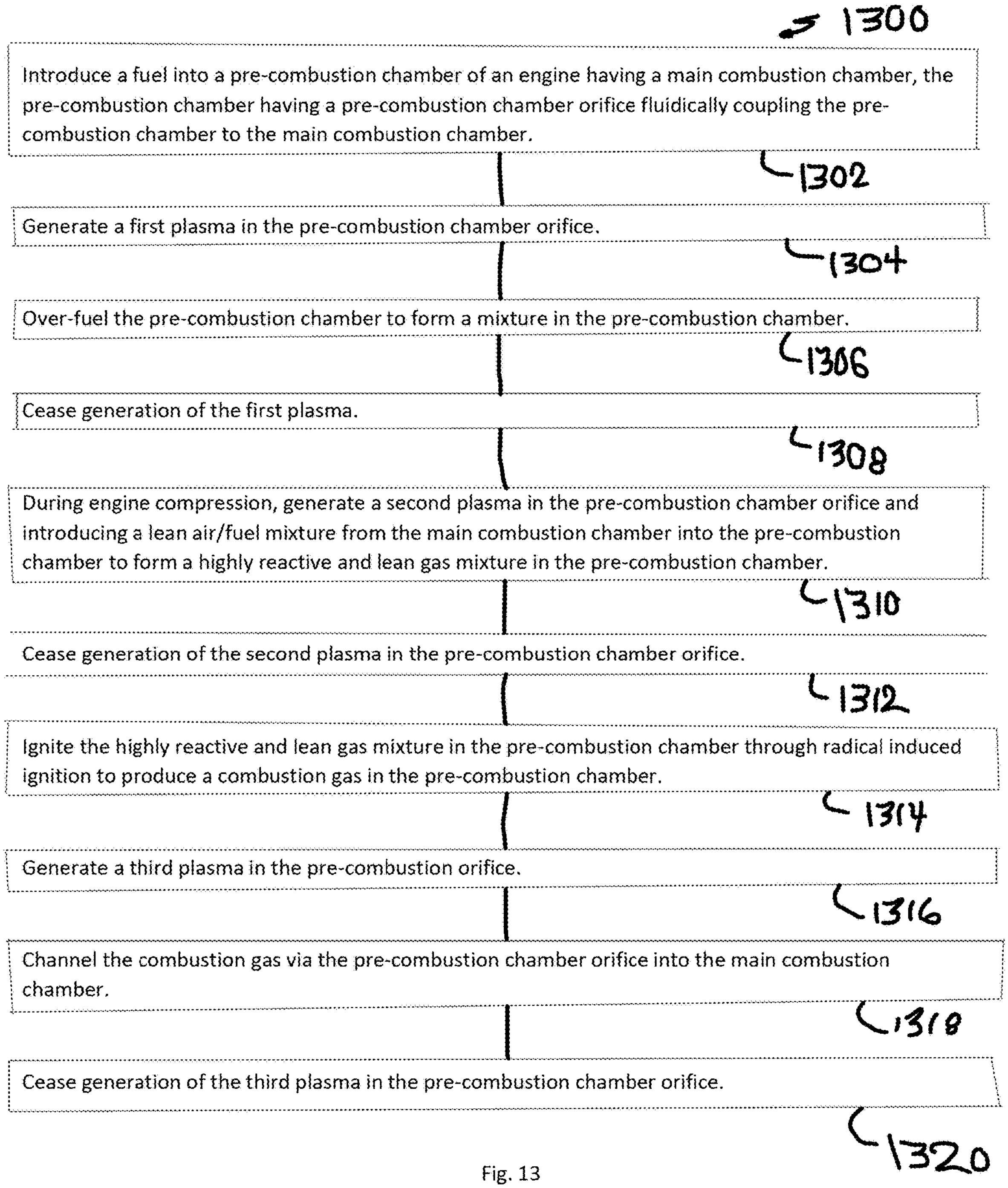
FIG. 13 shows a method for ignition and combustion in an engine including a pre-combustion chamber, a main combustion chamber, over-fueling, inflow plasma generation, outflow plasma generation, and radical-induced ignition in accordance with some embodiments of the present disclosure.

FIG. 13 shows a method 1300 for ignition and combustion in an engine including a pre-combustion chamber, a main combustion chamber, over-fueling, inflow plasma generation, outflow plasma generation, and radical-induced ignition in accordance with some embodiments of the present disclosure. The method 1300 includes introducing a fuel into a pre-combustion chamber of an engine having a main combustion chamber, the pre-combustion chamber having a pre-combustion chamber orifice fluidically coupling the pre-combustion chamber to the main combustion chamber (block 1302); generating a first plasma in the pre-combustion chamber orifice (block 1304); over-fueling the pre-combustion chamber to form a mixture in the pre-combustion chamber (block 1306); ceasing generation of the first plasma (block 1308); during engine compression generating a second plasma in the pre-combustion chamber orifice and introducing a lean air/fuel mixture from the main combustion chamber into the pre-combustion chamber to form a highly reactive and lean gas mixture in the pre-combustion chamber (block 1310); ceasing generation of the second plasma in the pre-combustion chamber orifice (block 1312); igniting the highly reactive and lean gas mixture in the pre-combustion chamber through radical induced ignition to produce a combustion gas in the pre-combustion chamber (block 1314); generating a third plasma in the pre-combustion orifice (block 1316); channeling the combustion gas via the pre-combustion chamber orifice into the main combustion chamber (block 1318); and ceasing generation of the third plasma in the pre-combustion chamber orifice (block 1320).

Referring to FIG. 1 and FIG. 6, the apparatus shown in FIG. 1 and the apparatus shown in FIG. 6 can be used to implement method 1300 in accordance with some embodiments of the present disclosure. For example, a fuel is introduced into the pre-combustion chamber 102 through the fueling port 105. A first plasma may be generated in the pre-combustion chamber 102 by providing a high energy signal to the electrode 104 included in the pre-combustion chamber neck 106. Example high energy signals include high voltage radio-frequency signals and high energy nanosecond pulse signals. In some embodiments, signals having a voltage of between ten kilovolts and twenty kilovolts are provided to the electrode 104. In some embodiments, the signals are pulses having a pulse width of between about ten nanoseconds and one-hundred nanoseconds. The time between pulses is between about one-hundred nanoseconds and one microsecond. Over-fueling is putting enough fuel into the pre-combustion chamber 102 that it blows out into the main chamber 602. Ceasing generation of the first plasma is accomplished by shutting off the high energy signal previously provided to the electrode 104. During engine compression, a second plasma is generated in the pre-combustion chamber 102 by providing a high energy signal to the electrode 104 included in the pre-combustion chamber neck 106. A lean air/fuel mixture is introduced from the main combustion chamber 602 into the pre-combustion chamber 102 to form a substantially stoichiometric gas mixture in the pre-combustion chamber 102 during compression. Substantially stoichiometric is the ideal ratio of air to fuel (A/F ratio) for a given fuel. Lambda is the actual A/F ratio/stoichiometric A/F ratio. As used herein, substantially stoichiometric is lambda=to about 0.7 to lambda=about 1.3. Ceasing generation of the second plasma is accomplished by shutting off the high energy signal previously provided to the electrode 104 located in the pre-combustion chamber neck 106.

Radical induced ignition is ignition that results from a high concentration of radicals in the fuel mixture and occurs spontaneously in the pre-combustion chamber 102 without energy being provided by a spark plug, a plasma plug, or other ignition source. A third plasma is generated in the pre-combustion chamber 102 by providing a high energy signal to the electrode 104 included in the pre-combustion chamber neck 106. And the combustion gas can be channeled via the pre-combustion chamber orifice 108 into the main combustion chamber 602 of the engine 604. Ceasing generation of the third plasma is accomplished by shutting off the high energy signal previously provided to the electrode 104.

Figure 14:
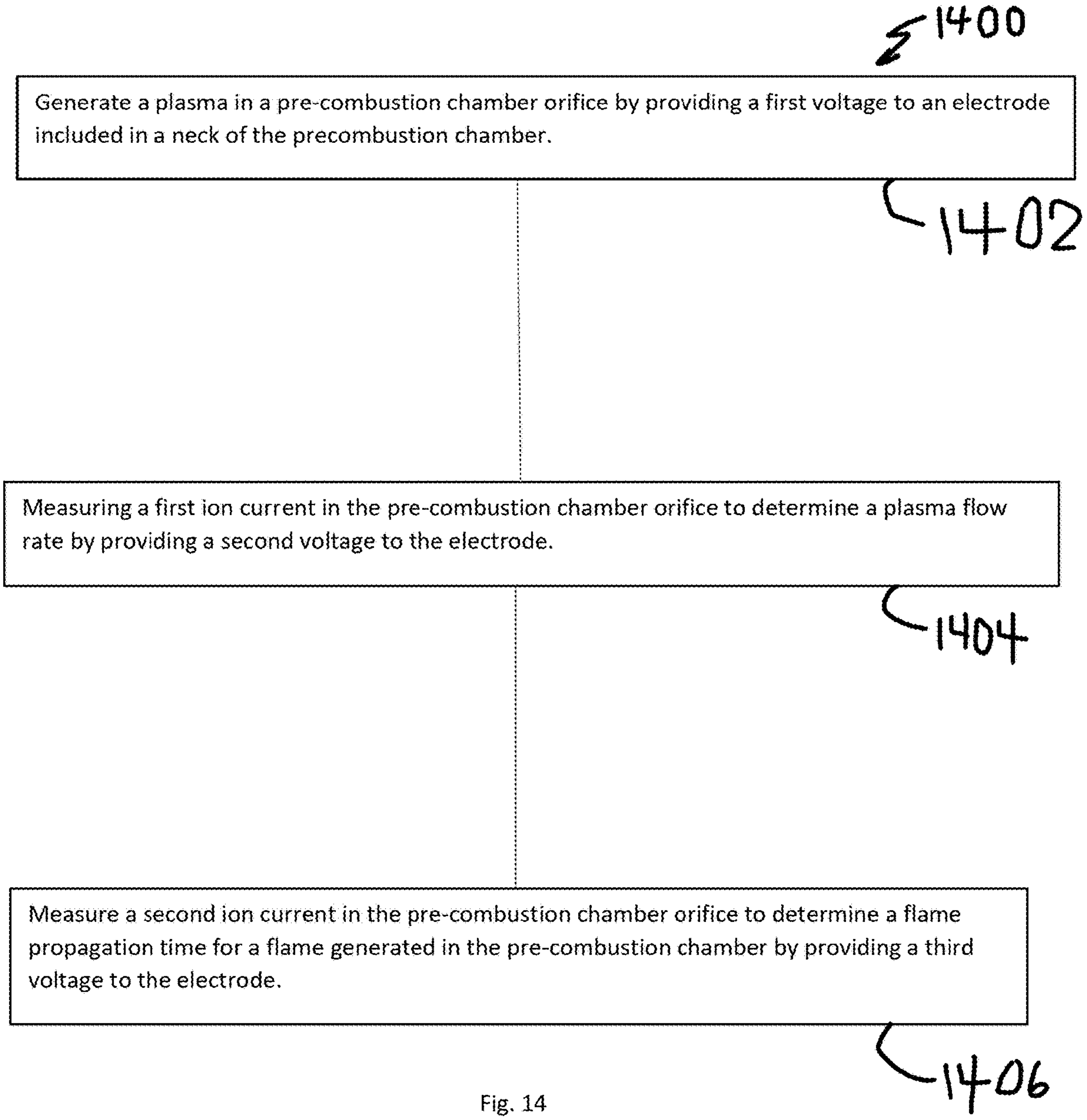
FIG. 14 shows a method for measuring ion currents to determine propagation time for a flame and plasma flow in a pre-combustion chamber in accordance with some embodiments of the present disclosure.

FIG. 14 shows a method 1400 for measuring ion currents to determine propagation time for a flame and plasma flow in a pre-combustion chamber in accordance with some embodiments of the present disclosure. The method 1400 includes generating a plasma in a pre-combustion chamber orifice by providing a first voltage to an electrode included in a neck of the precombustion chamber (block 1402); measuring a first ion current in the pre-combustion chamber orifice to determine a plasma flow rate by providing a second voltage to the electrode (block 1404); and measuring a second ion current in the pre-combustion chamber orifice to determine a flame propagation time for a flame generated in the pre-combustion chamber by providing a third voltage to the electrode (block 1406).

In some embodiments, generating the plasma in the pre-combustion chamber orifice by providing the first voltage to the electrode 104 included in the neck 106 of the precombustion chamber includes providing a voltage of between ten kilovolts and twenty kilovolts to the electrode 104 included in the pre-combustion chamber 102. In some embodiments, the signals are pulses having a pulse width of between about ten nanoseconds and one-hundred nanoseconds. The time between pulses is between about one-hundred nanoseconds and one microsecond.

In some embodiments, measuring the first ion current in the pre-combustion chamber orifice 108 to determine the plasma flow rate comprises providing a voltage of between about one-hundred volts and about one-thousand volts to an electrode 104 located in a neck 106 of the precombustion chamber 102. The ion current is then measured. In some embodiments, measuring the second ion current in the pre-combustion chamber orifice to determine the flame propagation time for the flame generated in the pre-combustion chamber by providing the third voltage of between about one-hundred volts and about one-thousand volts to the electrode 104. The ion current is then measured.

The following examples are exemplary non-limiting embodiments of methods, processes, and devices described in the present disclosure.

Example 1

A plasma plug can be used in combination with a pre-combustion chamber (PCC). The operations included in this non-limiting example include the following five operations. First, the PCC is fueled via electronic fuel injection or a check valve. Second, a lean air/fuel (A/F) mixture from the main chamber is pushed in to the PCC during compression. Third, a plasma generating plug ignites a stoichiometric mixture in the PCC. Fourth, the PCC ignites much more quickly than from a conventional spark plug and the gas exits the PCC orifice into the main chamber. And fifth, hot PCC gases ignite the main chamber.

Example 2

A plasma plug can be used in combination with a pre-combustion chamber (PCC) in a process including an over-fuel plasma and radical induced ignition. The operations included in this non-limiting example include the following six operations. First, the PCC is fueled via electronic fuel injection or a check valve while plasma is generated to produce radicals in the incoming fuel. Second, fuel injection and plasma generation continues through PCC "over-fueling" which pushes radicals into the top of the main combustion chamber (MCC). Third, plasma generation in the PCC orifice stops before expected ignition timing, leaving a pocket of an unburned air/fuel (A/F) mixture in the bottom of the PCC. Fourth, a highly reactive mixture in the PCC undergoes radical-induced ignition. Fifth, the PCC gases combust and push gases into the main chamber. Sixth, higher reactivity of the gases in the main chamber cause stronger and more complete main chamber combustion. Advantages provided in this example include a highly reactive ionized mixture created in the top of the MCC which results in a faster and more complete MCC combustion, reduction in carbon monoxide (CO) and unburned hydrocarbon (UHC), and potential reduction in nitrogen oxide and nitrogen dioxide (NOx). A further advantage of the example is that the system requires only a single ignition source and fewer electronic components than conventional systems.

Example 3

A spark plug in combination with a plasma orifice pre-combustion chamber (PCC) can be used in a process including outflow plasma generation. The operations included in this non-limiting example include the following five operations. First, the PCC is fueled via electronic fuel injection or a check valve. Second, a lean air/fuel (A/F) mixture from the main chamber is pushed into the PCC during compression. Third, the spark plug ignites a stoichiometric mixture in the PCC. Fourth, the PCC gases combust and expand into the main chamber and the plasma generated in the PCC orifice produce radicals in the unburned gas outflow entering the main chamber. Fifth, higher reactivity of the gases in the main chamber causes a stronger and more complete main chamber combustion. Advantages provided in this example include a highly reactive ionized mixture created in the top of the MCC which results in a faster and more complete MCC combustion, reduction in carbon monoxide (CO) and unburned hydrocarbons (UHC), and a potential reduction in nitrogen oxide and nitrogen dioxide (NOx). Further, the PCC can behave as a conventional PCC even without plasma, so starting problems inherent in such systems are avoided. Finally, the orifice electrode design can be optimized.

Example 4

A spark plug in combination with a plasma orifice pre-combustion chamber (PCC) can be used in a process including inflow and outflow plasma generation. The operations included in this non-limiting example include the following six operations. First, a PCC is fueled via electronic fuel injection or a check valve. Second, a lean air/fuel (A/F) mixture from the main chamber is pushed into the PCC during compression. Radical introduction within the inflow is induced by the plasma generated in the PCC orifice. Third, plasma generation in the PCC orifice stops before expected ignition timing, leaving a pocket of an unburned A/F mixture in the bottom of the PCC. Fourth, the spark plug ignites the highly reactive mixture in the PCC. Fifth, the PCC gases combust and push gases into the main chamber and the plasma generated in the PCC orifice produce radicals in the unburned gas outflow entering the main chamber. Sixth, the higher reactivity of the gases in the main chamber causes stronger and more complete main chamber combustion. Advantages provided in this example include a highly reactive ionized mixture created in the top of the main combustion chamber (MCC) which results in a faster and more complete MCC combustion, reduction in carbon monoxide (CO) and unburned hydrocarbon (UHC), and potential reduction in nitrogen oxide and nitrogen dioxide (NOx). In addition, the PCC can still operate as a conventional PCC even without the plasma.

Example 5

A plasma orifice pre-combustion chamber (PCC) usings a park plug includes over-fuel, inflow and outflow plasma generation. The six operations included in this non-limiting example include the following operations. First, the PCC is fueled via electronic fuel injection or check valve. Second, fuel injection and plasma generation continues through PCC "over-fueling". Fuel is introduced with radicals in PCC orifice and collect in top of main chamber. Third, lean A/F mixture form main chamber pushed into PCC during compression. Radical introduction within inflow by plasma generated in PCC orifice. Radicals from over-fueling remain in top of main chamber. Fourth, the PCC introduced with the lean air/fuel (A/F) mixture from the main chamber during compression. The spark plug ignites the highly reactive lean mixture in the CC. Fifth, the PCC gases combust and push gases into main chamber. Plasma generated in the PCC orifice produce radicals in unburned gas outflow entering main combustion chamber (MCC). Sixth, higher reactivity of the gases in the main combustion chamber cause stronger and more complete main chamber combustion. Advantages provided in this example include a highly reactive ionized mixture created in the top of MCC which results in a faster and more complete MCC combustion, reduction in carbon monoxide (CO) and unburned hydrocarbon (UHC) and potential reduction in nitrogen oxide and nitrogen dioxide (NOx). Further the PCC can still operate as a conventional PCC even without plasma. Finally, additional introduction of "over-fueling" radicals potentially further increases main chamber combustion efficiency.

Example 6

A plasma orifice pre-combustion chamber (PCC) includes inflow plasma generation and radical induced ignition. The operations included in this non-limiting example include the following six operations. First, the PCC is fueled via fuel injection or a check valve. Second, a lean air/fuel (A/F) mixture formed in the main chamber is pushed into the PCC during compression. Radical introduction occurs within the inflow by the plasma generated in the PCC orifice. Third, plasma generation in the PCC orifice stops before expected ignition timing, leaving a pocket of an unburned A/F mixture in the bottom of the PCC. Fourth, a highly reactive mixture of the PCC undergoes radical-induced ignition. Fifth, the PCC gases combust and push gases into the main chamber. Plasma generated in the PCC orifice produces radicals in the unburned gas outflow entering the main chamber. Sixth, the higher reactivity of the gases in the main chamber causes stronger and more complete main chamber combustion. Advantages provided in this example include a highly reactive ionized mixture created in the top of the main combustion chamber (MCC) a which results in a faster and more complete MCC combustion including a reduction in carbon monoxide (CO) and unburned hydrocarbon gases (UHG), and potential reduction in nitrogen oxide and nitrogen dioxide (NOx). Further, the example provides for a single ignition source. Finally, the example includes fewer electronic components than found in conventional systems.

Example 7

A plasma orifice pre-combustion chamber PCC includes inflow and outflow plasma generation and radical induced ignition. The operations included in this non-limiting example include the following six operations. First, the PCC is fueled via electronic fuel injection or a check valve. Second, a lean air/fuel (A/F) mixture from the main combustion chamber (MCC) is pushed into the PCC during compression. Radical introduction within inflow is introduced by plasma generated in the PCC orifice. Third, plasma generation in the PCC orifice stops before expected ignition timing, leaving a pocket of unburned A/F mixture in the bottom of the PCC. Fourth, a highly reactive PCC mixture undergoes radical-induced ignition. Fifth, the PCC gases combust and push gases into the MCC and plasma generated in the PCC orifice produce radicals in the unburned gas outflow entering the MCC. Sixth, the higher reactivity of the gases in the MCC cause a stronger and more complete main chamber combustion. Advantages provided by this example include a highly reactive ionized mixture created in the top of the MCC which results in faster and more complete MCC combustion, reduction in carbon monoxide (CO) and unburned hydrocarbon (UHC), and potential reduction in nitrogen oxide and nitrogen dioxide (NOx). Further, additional introduction of "over-fueling" radicals potentially further increases the MCC combustion efficiency.

Example 8

A plasma orifice pre-combustion chamber (PCC) includes over-fuel, inflow plasma generation, outflow plasma generation, and radical-induced ignition. The operations included in this non-limiting example include the following six operations. First, the PCC is fueled via electronic fuel injection or a check valve. Second, fuel injection and plasma generation continues through PCC "over-fueling". Fuel is introduced with radicals in the PCC orifice and collect in the top of main combustion chamber (MCC). Third, a lean air/fuel (A/F) mixture from the MCC is pushed into the PCC during compression. Radical introduction within inflow by plasma is generated in the PCC orifice. Radicals from over-fueling remain in top of the MCC. Fourth, the highly reactive PCC mixture undergoes radical-induced ignition. Fifth, PCC gases combust and push gases into the MCC and plasma generated in PCC orifice produce radicals in unburned gas outflow entering the MCC. Sixth, higher reactivity of the gases in the main chamber cause stronger and more complete MCC combustion. Advantages provided by this example include highly reactive ionized mixture created in top of the MCC results in faster and more complete MCC combustion and reduction in carbon monoxide (CO) and unburned hydrocarbon (UHC) and potential reduction in nitrogen oxide and nitrogen dioxide (NOx).

Further, the PCC can still behave as conventional a PCC even without plasma. Finally, additional introduction of "over-fueling" radicals potentially further increases the MCC combustion efficiency.

Example 9

A method of orifice ion sensing includes the following four operations. First, sensing ion current in the orifice is used to determine the presence of flammable mixture. Second, sensing is achieved with the same electrode used in plasma generation. Third, no sensing at or near plasma generation period. Fourth, drop off of sensed current indicates purge of ionized and burning gases.

Example 10

A method for pre-combustion chamber burn duration in ion sensing includes four operations. First, use ion current sensing in the orifice to determine the presence of a flammable mixture. Second, sensing is achieved with the same electrode used in plasma generation. Third, increase in sensed current indicates presence of flame front. Fourth, the time difference between spark timing and threshold of ion current can indicate pre-combustion chamber (PCC) burn duration.

Example 11

A method for ion-sensor based tuning includes four operations. First, by attaching an ion sensing circuit to the TORQ, the time between the spark and flame reaching the neck can be determined. Second, by attaching a current sensor to the ignition (either primary or secondary) when ignition happens is exactly known and can be adjusted accordingly. Third, knowing the propagation time from the spark to the TORQ provides a basis for tuning the event. Fourth, knowing if the delay has changed indicates that the pre-charge of the prechamber is working. In addition, as air and fuel flow into the chamber they can be energized with the plasma TORQ in order to allow for leaner combustion.

Example 12

A cylinder control module includes the following four functions. First, the module provides a plasma supply opening up to three segments per cylinder event with multiple pulses per segment. Second, the module provides prechamber fuel detector. Third, the cylinder control module provides a pressure sensor input. Further, the cylinder control module provides a spark sensor.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments. As used herein, "about" includes values that are plus or minus ten percent of the recited value.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method comprising:

introducing a fuel into a pre-combustion chamber of an engine having a main combustion chamber;

generating a plasma in the pre-combustion chamber;

over-fueling the pre-combustion chamber to form a mixture in the pre-combustion chamber;

ceasing the generation of the plasma;

igniting the mixture in the pre-combustion chamber through radical induced ignition to produce a combustion gas in the pre-combustion chamber; and channeling the combustion gas via the pre-combustion chamber orifice into the main combustion chamber.

2. A method comprising:

introducing a fuel into a pre-combustion chamber of an engine having a main combustion chamber, the pre-combustion chamber having a pre-combustion chamber orifice fluidically coupling the pre-combustion chamber to the main combustion chamber;

during engine compression, introducing a lean air/fuel mixture from the main combustion chamber into the pre-combustion chamber to form a substantially stoichiometric gas mixture in the pre-combustion chamber;

generating a plasma in the pre-combustion orifice;

igniting a spark plug in the pre-combustion chamber to ignite the substantially stoichiometric gas mixture to form a combustion gas in the pre-combustion chamber;

channeling the combustion gas via the pre-combustion chamber orifice into the main combustion chamber; and ceasing the generation of the plasma.

* * * * *